United States Patent
Nattress

(10) Patent No.: US 8,274,026 B2
(45) Date of Patent: Sep. 25, 2012

(54) FOCUS ASSIST SYSTEM AND METHOD

(75) Inventor: Thomas Graeme Nattress, Ontario (CA)

(73) Assignee: RED.COM, Inc., Irvine, CA (US)

(*) Notice: Subject to any disclaimer, the term of this patent is extended or adjusted under 35 U.S.C. 154(b) by 46 days.

(21) Appl. No.: 12/479,546

(22) Filed: Jun. 5, 2009

(65) Prior Publication Data

US 2009/0245677 A1 Oct. 1, 2009

Related U.S. Application Data

(62) Division of application No. 11/561,785, filed on Nov. 20, 2006, now Pat. No. 7,544,919.

(51) Int. Cl.
*G02B 7/04* (2006.01)
*H04N 17/00* (2006.01)
*G03B 13/00* (2006.01)

(52) U.S. Cl. ............ 250/201.2; 348/185; 348/346

(58) Field of Classification Search .... 250/201.1–201.4, 250/204, 204.1, 216; 396/104, 124, 125, 396/76–80, 82, 131; 348/185–188, 208.12, 348/208.13, 326, 345–349; 369/44.34, 103, 369/109.01, 109.02
See application file for complete search history.

(56) References Cited

U.S. PATENT DOCUMENTS

| | | | |
|---|---|---|---|
| 4,251,143 A | 2/1981 | Stemme et al. | |
| 4,300,826 A | 11/1981 | Aoki et al. | |
| 4,313,657 A | 2/1982 | Tokutomi et al. | |
| 4,329,032 A | 5/1982 | Aoki et al. | |
| 4,341,451 A | 7/1982 | Krueger et al. | |
| 4,341,953 A | 7/1982 | Sakai et al. | |
| 4,344,686 A | 8/1982 | Stemme et al. | |
| 4,373,791 A | 2/1983 | Araki | |
| 4,443,087 A | 4/1984 | Kashihara et al. | |
| 4,571,046 A | 2/1986 | Suzuki et al. | |
| 4,597,659 A | 7/1986 | Suda et al. | |
| 4,627,700 A | 12/1986 | Nakamura et al. | |
| 4,794,459 A | 12/1988 | Moberg et al. | |
| 4,994,843 A | 2/1991 | Kitazawa | |
| 5,264,889 A | 11/1993 | Ishida et al. | |
| 5,307,112 A | 4/1994 | Aoyama | |
| 5,496,106 A | 3/1996 | Anderson | |
| 5,528,332 A | 6/1996 | Furutsu | |
| 5,563,678 A * | 10/1996 | Kusaka | 396/121 |

(Continued)

FOREIGN PATENT DOCUMENTS

JP 20022209135 A 7/2002

(Continued)

OTHER PUBLICATIONS

JVC, HD Camera Recorder, GY-HD100, GY-HD101, HDV Mini DV Instructions, LWT0278-001A-H, 2005 Victor Company of Japan, Limited.

(Continued)

*Primary Examiner* — Georgia Y Epps
*Assistant Examiner* — Don Williams
(74) *Attorney, Agent, or Firm* — Knobbe, Martens, Olson & Bear, LLP

(57) ABSTRACT

The invention relates to image focus. In particular, it relates to a focus assist system that conveys focus level data to a user. There are a wide variety of different display methods, including, but not limited to, graphs, highlights, symbols, and varied levels of brightness or color.

44 Claims, 14 Drawing Sheets

U.S. PATENT DOCUMENTS

| | | | |
|---|---|---|---|
| 5,659,812 A * | 8/1997 | Uchiyama | 396/104 |
| 5,687,409 A | 11/1997 | Miyamoto | |
| 5,909,598 A | 6/1999 | Kadohara | |
| 6,035,054 A | 3/2000 | Odaka et al. | |
| 6,584,284 B1 | 6/2003 | Odaka | |
| 6,937,284 B1 | 8/2005 | Singh et al. | |
| 7,324,151 B2 * | 1/2008 | Onozawa | 348/346 |
| 7,544,919 B2 | 6/2009 | Nattress | |
| 2003/0174230 A1 | 9/2003 | Ide et al. | |
| 2003/0174233 A1 | 9/2003 | Onozawa | |
| 2004/0036792 A1 | 2/2004 | Moriya et al. | |
| 2004/0046938 A1 | 3/2004 | Gero | |
| 2004/0165879 A1 | 8/2004 | Sasaki et al. | |
| 2004/0218086 A1 | 11/2004 | Voss et al. | |
| 2005/0219362 A1 * | 10/2005 | Garoutte | 348/180 |
| 2005/0254812 A1 | 11/2005 | Kosaka et al. | |
| 2005/0259161 A1 | 11/2005 | Lan et al. | |
| 2006/0008264 A1 | 1/2006 | Yamaguchi et al. | |
| 2006/0045504 A1 * | 3/2006 | Zarnowski et al. | 396/79 |
| 2006/0098970 A1 | 5/2006 | Sato | |
| 2007/0002143 A1 | 1/2007 | Elberbaum | |

FOREIGN PATENT DOCUMENTS

| | | | |
|---|---|---|---|
| JP | 2003 140024 A | 5/2003 | |
| JP | 2003-153043 | 5/2003 | |
| JP | 2004 072297 A | 3/2004 | |
| JP | 20042420009 A | 8/2004 | |
| JP | 2005 345590 A | 12/2005 | |
| JP | 2006 108973 A | 4/2006 | |

OTHER PUBLICATIONS http://pro.jvc.com/prof/attributes/tech_desc.jsp?model_id=MDL101642&feature_id=02, 2 pages.

http://pro.jvc.com/prof/attributes/tech_desc.jsp?model_id=MDL101623&feature_id=02, 3 pages.

JVC, JVC HDV Camcorder GY-HD100 Technical Report, 7pages.

International Search Report for PCT Application No. PCT/US2007/082434, date of mailing May 6, 2008.

European Communication from European Patent Office in related Application No. EP07844578.0, in 5 pages, dated Mar. 31, 2011.

Translation of Office Action in related Application No. CN200780042981.4, in 6 pages, dated Aug. 26, 2010.

Examination Report in related Application No. NZ 577055, in 2 pages, dated Dec. 20, 2010.

Translation of Office Action in related Application No. JP2009-537260, in 3 pages, dated May 11, 2011.

Written Opinion issued from Australian Patent Office in related Application No. SG200903348-1, in 6 pages, dated Apr. 7, 2010.

Office Action in Russian Application No. 2009119259/28(026524) dated Sep. 8, 2011.

Translation of Office Action received in related Application No. CN200780042981.4, in 6 pages, dated Mar. 7, 2012.

Translation of Office Action received in related Application No. JP2009-537260, in 6 pages, dated Feb. 14, 2012.

\* cited by examiner

FOCUS ASSIST SYSTEM AND METHOD

PRIORITY INFORMATION

This application is a divisional of U.S. application Ser. No. 11/561,785, filed Nov. 20, 2006, scheduled to issue as U.S. Pat. No. 7,544,919, the entirety of which is hereby incorporated by reference.

BACKGROUND

1. Field of the Invention

The invention relates to providing focus information.

2. Description of the Related Art

There are two basic methods of focusing a camera or optical instrument.

In an autofocus system, the camera sets the focus level with little or no user input. The camera collects data about the relative focus level of objects in the camera lens. It uses an algorithm to interpret that data and set an optimum focus level. However, this algorithm does not necessarily execute the photographer's intentions. Many autofocus algorithms prioritize objects that are close to the center of the frame or that are brightly lit. If the object of the photographer's interest is off-center or dimly lit, the autofocus algorithm may calibrate a focus level based on objects in which the photographer has no interest.

Manual focus cameras require more effort from the user. But, they also give the photographer more control over the focus level. Because manual focus cameras are more responsive to the user's wishes and potentially more precise, professionals often use manual focus cameras.

Whichever system a camera employs—autofocus or manual focus—the ability of the system to yield desirable results depends on the user's ability to confirm which objects are in or out of focus. In an autofocus system, if it is unclear which objects are in or out of focus, the user cannot confirm that the autofocus algorithm has identified the user's primary objects of interest and set the focus level accordingly. In a manual focus system, if a user cannot confirm which objects are in or out of focus, the user cannot confirm the precision of focus adjustments.

Camera displays may be too small or imprecise to reliably convey to the user whether or not an object is in focus, or if out of focus, just how much out of focus. They do not often allow the user to distinguish between gradations in the focus level or balance the focus level between multiple objects in the viewfinder.

SUMMARY

An optical lens having a variable focal length is used to detect an image. The lens focuses the image on a sensor, and the sensor captures information corresponding to individual picture elements (pixels). A display shows the detected image.

In order to assist a user adjust the focus of the image, a waveform indicates a degree of focus. The waveform may be superimposed on the image, or may be displayed adjacent to the image. Alternatively, the waveform may be displayed on a separate screen. The waveform is updated in real-time, allowing the user to adjust the focus contemporaneously. The display of the degree of focus could be used, e.g., for still cameras and motion picture cameras.

The optical sensor converts the image from the lens into a two-dimensional, digital array of pixels, with the array of pixels arranged in rows and columns. In one embodiment, a processor operates on a row of pixels to determine focus level data for a plurality of pixels in that row.

The waveform may indicate the degree of focus through color variations, intensity variations, density variations, amplitude variations, or other visual indicia. A combination of different types of indicia may be used.

The focus level data may be determined, for example, with an edge detection algorithm. In one embodiment, the focus level data is determined by comparing at least a portion of the digital array of pixels with a blurred rendition of the same portion of the array.

In one embodiment, an image is detected using a two-dimensional array of optical sensors. The detected image is converted into a data structure that represents the detected image as a two-dimensional array of pixel values, where the pixel values are representative of an amount of light detected by the optical sensors. A blurred image is generated by combining a selected pixel value with a plurality of pixel values from the vicinity of the selected pixel value. The degree of focus is then determined by comparing the selected pixel value with a corresponding blurred image pixel value. A visual indication of the degree of focus is then provided. In one embodiment, the visual indication of the degree of focus may be overlaid on a representation of the detected image. In another embodiment, the visual indication of the degree of focus is adjacent to a representation of the detected image. Providing the visual indication of the degree of focus may comprise displaying a waveform corresponding to the degree of focus. A point on the waveform may corresponds to an average degree of focus for a plurality of vertically aligned pixels. In another embodiment, a point on the waveform may correspond to an average degree of focus for a plurality of horizontally aligned pixels. In yet another embodiment, a point on the waveform may correspond to an average degree of focus for a plurality of pixels in a block. In a further embodiment, a point on the waveform corresponds to an average degree of focus for a plurality of non-adjacent pixels.

In one embodiment, a method of providing feedback to allow focusing an image in real time comprises using a programmed algorithm to determine a degree of focus of a plurality of regions and providing a visual indication of the degree of focus of each region. The visual indication may take a variety of formats, such as, for example, a waveform, varying the relief of a region, or indication of focus by a geometric figure. The region may be, for example, a line or a regular geometric pattern. In one embodiment, the degree of focus of a region may indicated by varying the color of the region. In another embodiment, the degree of focus of a region may be indicated by varying the brightness of the region. The regions may be described by edge detection, and the degree of focus of each region may be indicated by varying, e.g., the brightness or color of an edge.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DETAILED DESCRIPTION

The following description of different implementations has been presented by way of example only, and should not be read in a limiting sense. The scope of the present invention is defined only by the claims.

In one embodiment, a camera displays focus level data to a user. The focus level data may be superimposed on the primary viewfinder screen, or it may be displayed on a secondary screen. Various optical imaging systems—such as the motion picture camera or the photo camera—might generate and display focus level data. However, the invention is not limited to cameras. Any optical imaging system can display focus level information to the user. Examples include light microscopes, telescopes, or binoculars. Similarly, non-optical instruments that produce an image can also display focus level information to the user. An example is an electron microscope. Further, an algorithm can generate and display focus level data to the user for images or videos after they have been recorded.

Figure 1:
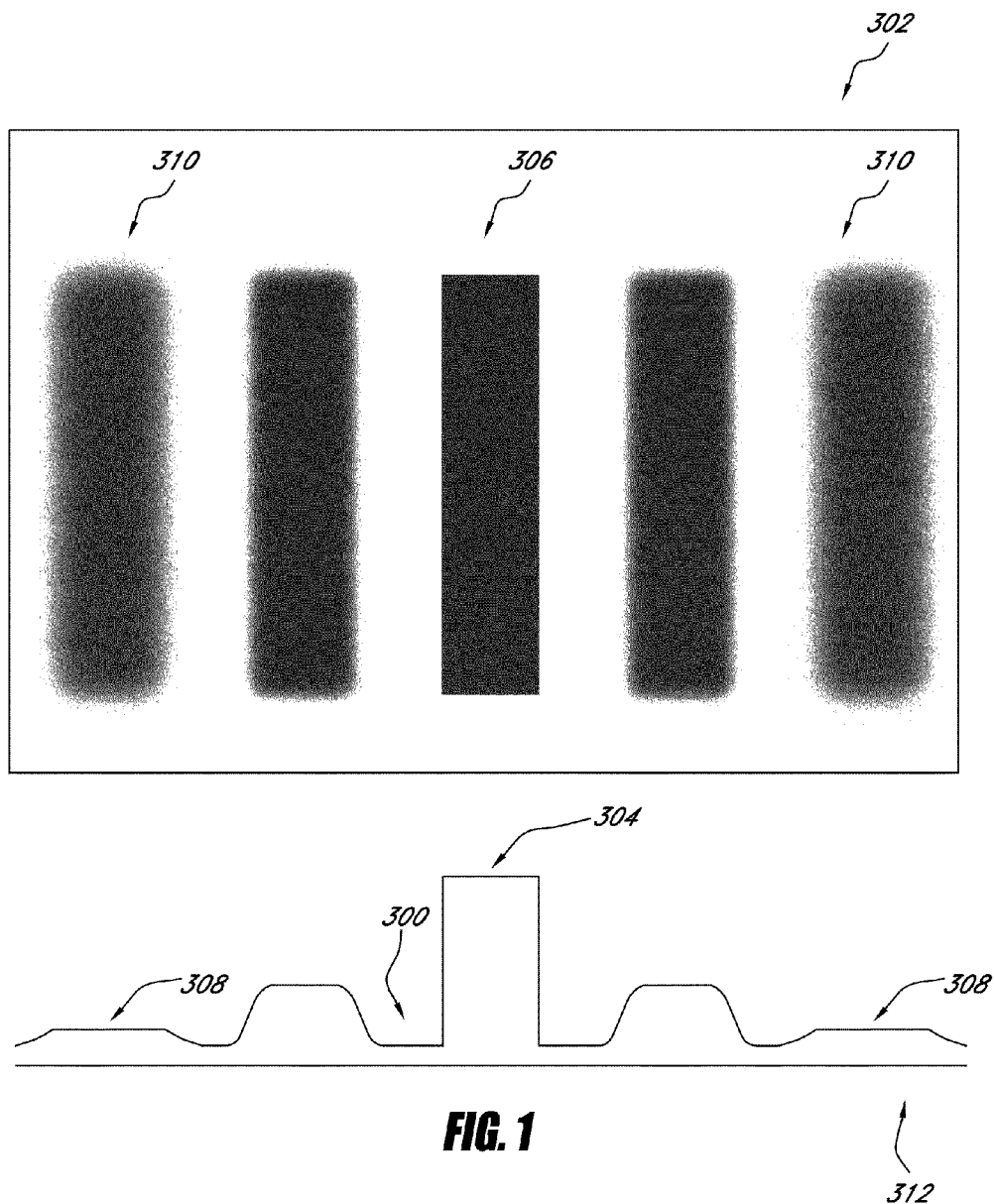
FIG. 1 shows a horizontal line graph conveying focus level data.

A wide variety of different display techniques convey focus level data to the user. For instance, FIG. 1 shows a line graph 300 oriented below the image 302. Alternatively the camera or display might show the line graph superimposed on the image. The line graph 300 displays higher values 304 for objects in greater focus 306. It displays lower values 308 for less well focused objects 310. The x-axis 312 represents a baseline level of focus, below which no focus level data is displayed. The x-axis 312 threshold may be set according to a number of different criteria. It might reflect some absolute number-value related to the slope of the gradient—the gradient being calculated by an edge detection algorithm as explained below. Or, the threshold might be tied dynamically to an average focus level of the entire image. So, the threshold could be set to 150% or 200% of the average focus level. This mechanism could be used to eliminate low, "noise" values from the display or to display data only for those display objects considered to be in focus or relatively in focus.

In one embodiment, the focus level data displayed on line graph 300 covers a continuous range of focus level values—or at least continuous in a discrete, digital sense, limited by pixels and sampling rate. This does not necessarily mean that the values on the line graph 300 correspond one for one to the focus level value at a given point on the image 302. The line graph 300 may be continuous, and yet represent an adjusted function of the raw focus level data that is better perceived by the user.

A single, horizontal line graph 300 like the one in FIG. 1 might not accurately convey focus level information for objects oriented vertically in the image. Because the line graph displays only one value for each horizontal point, it might obscure different focus levels oriented vertically with respect to that point.

Figure 2:
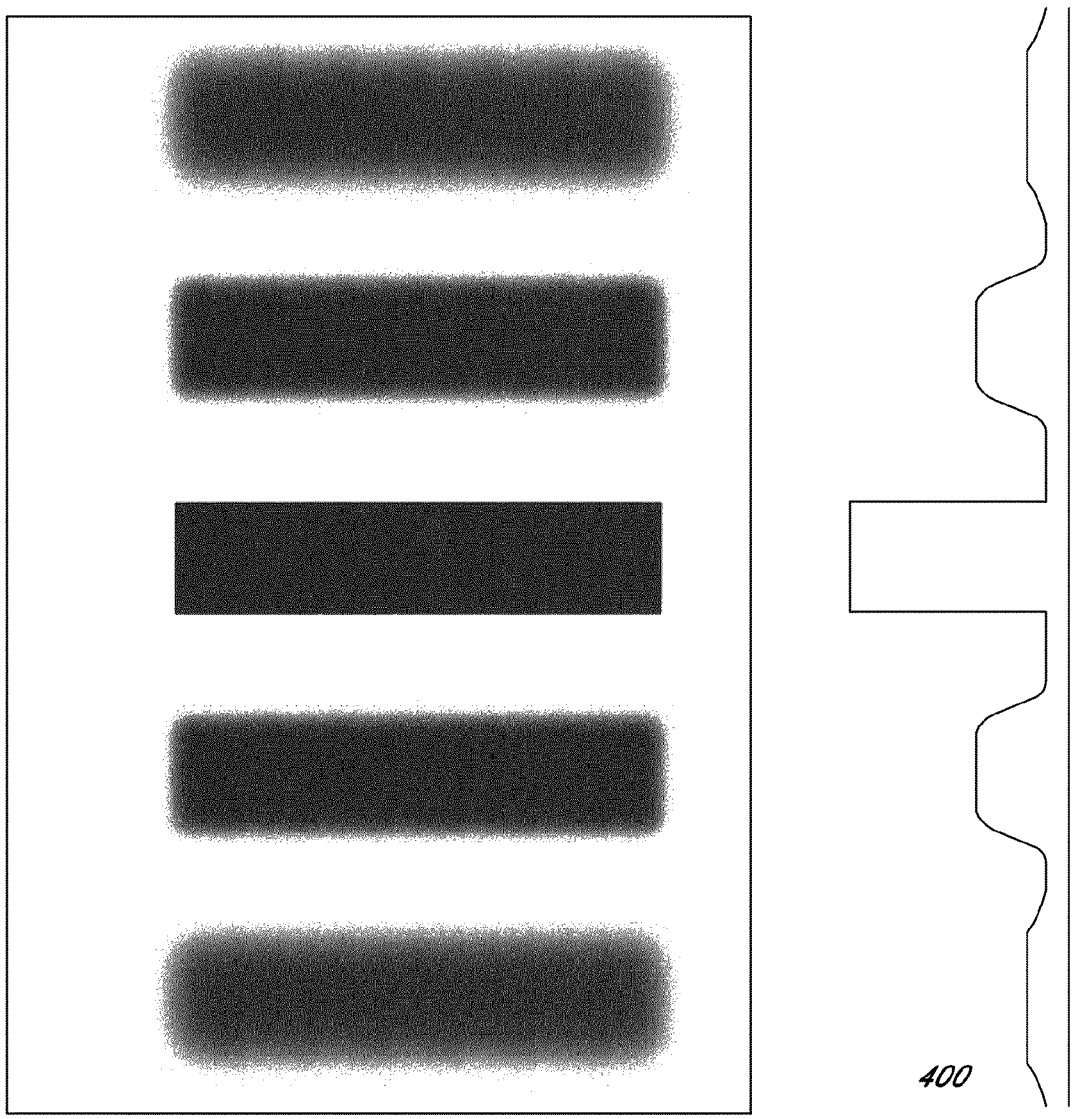
FIG. 2 shows a vertical line graph conveying focus level data.

FIG. 2 shows a vertical line graph 400 display. It displays more accurate focus level information for vertically oriented objects, but might obscure different focus levels for horizontally oriented objects. Another display might combine vertical and horizontal line graphs. Such a display overcomes some of the disadvantages of either the horizontal or vertical displays alone. But, depending upon how the data is presented, it may require the user to glance at two different locations to obtain focus level information for what may be a fleeting image.

Figure 3:
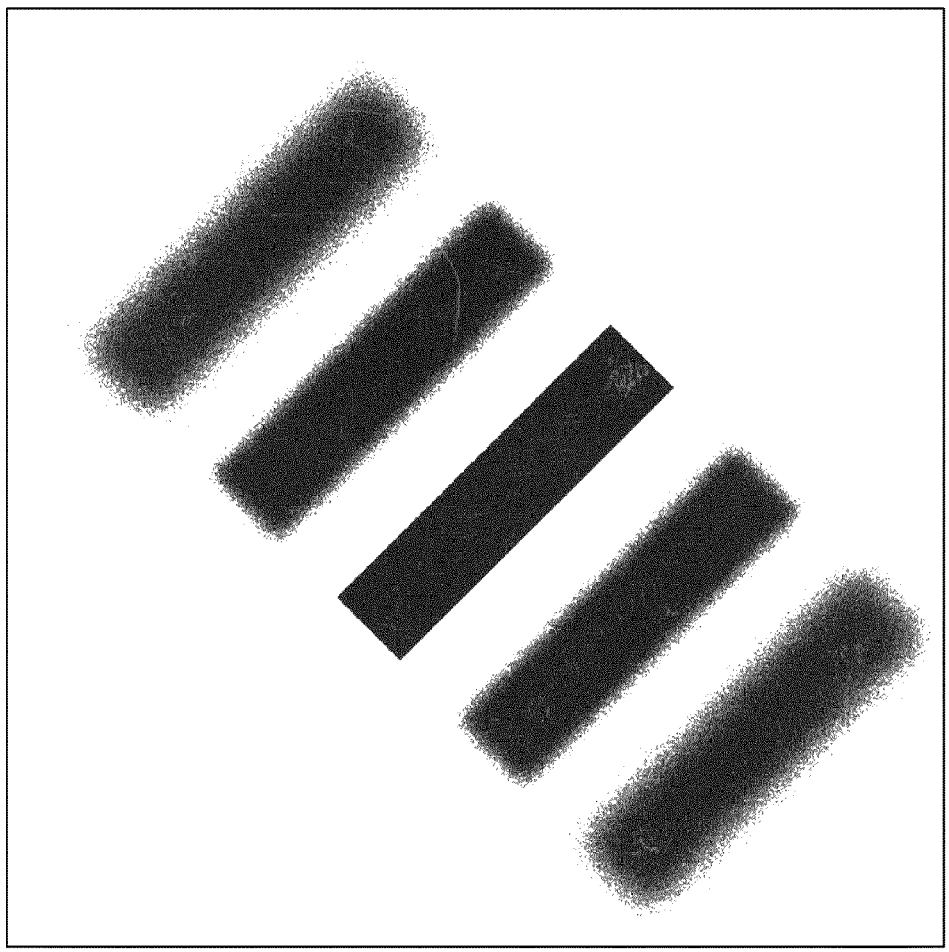
FIG. 3 shows a horizontal line graph conveying focus level data with three separate lines.
Figure 3:
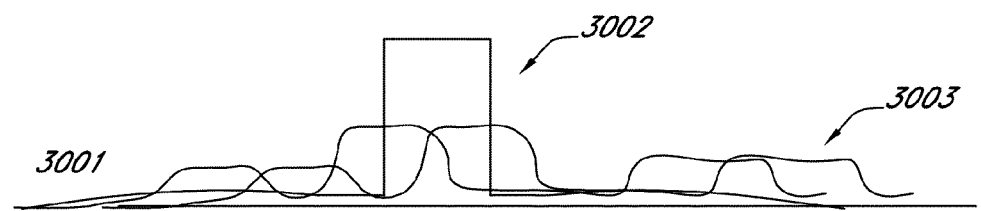

FIG. 3 shows another horizontal line graph. However, this horizontal line graph comprises several lines. Each line represents focus level information for a different area of the image 302. For example, one or more lines 3001 represent focus level information for the top of the image 302. One or more lines 3002 represent focus level information for the middle of the image 302. One or more lines 3003 represent focus level information for the bottom of the image 302. Where the focus level is very similar at the top, middle, and bottom of the image, the lines begin to overlap and intensify.

Figure 4:
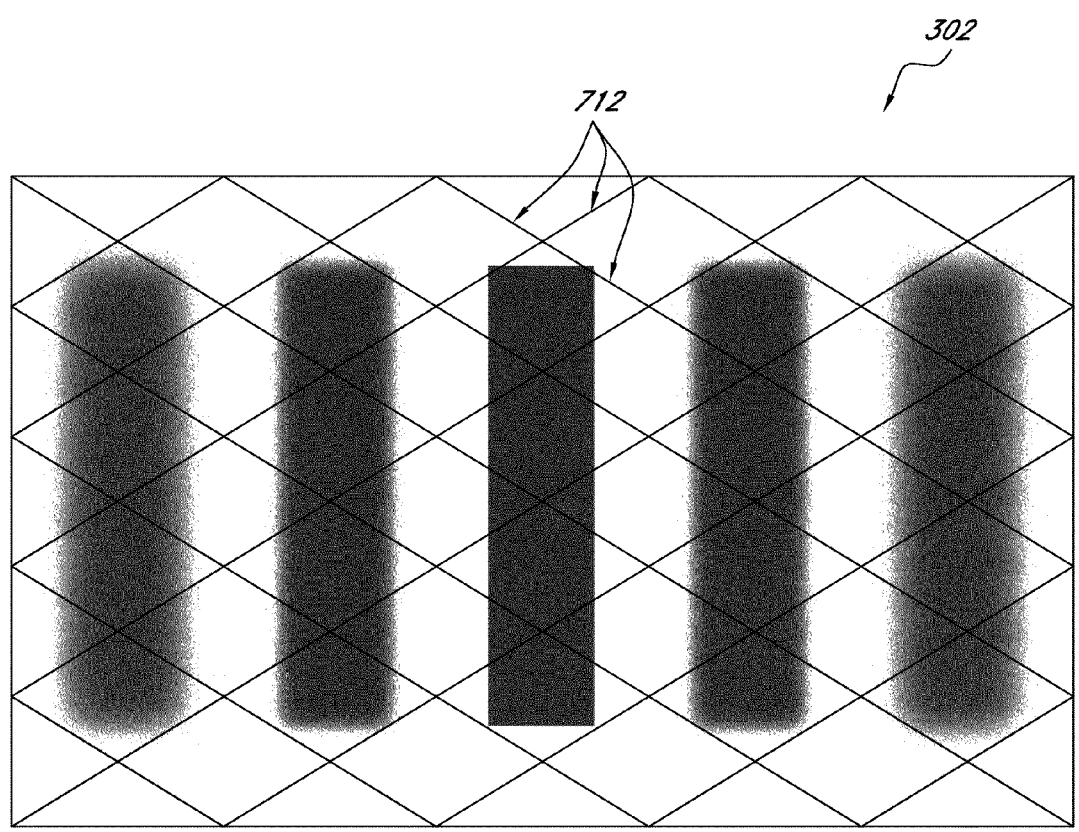
FIG. 4 shows a grid overlaid on an image, by which grid, focus level data may be calculated or displayed.

Other embodiments do not use a graph display. For instance, FIG. 4 shows a grid 712 superimposed on the image 302. The grid 712 itself need not be visible to the user. But, the grid regions 714 each indicate a focus level. One method of indicating focus level is a color tint on the region 714. So, a very well focused region 714 might have a first color such as a red tint. A very poorly focused region 714 might have a second color such as a violet tint. Regions 714 with focus levels neither very well nor very poorly focused may carry a tint along the color spectrum, which correspond to their respective focus levels.

Another method of indicating focus level within a grid region 714 is to vary the brightness level of each region 714. A very well focused region 714 might have a first, relatively high brightness. A very poorly focused region 714 might have a second, relatively low (dark) brightness. Regions 714 with focus levels in between may carry a level of brightness corresponding their respective focus levels.

Figure 5:
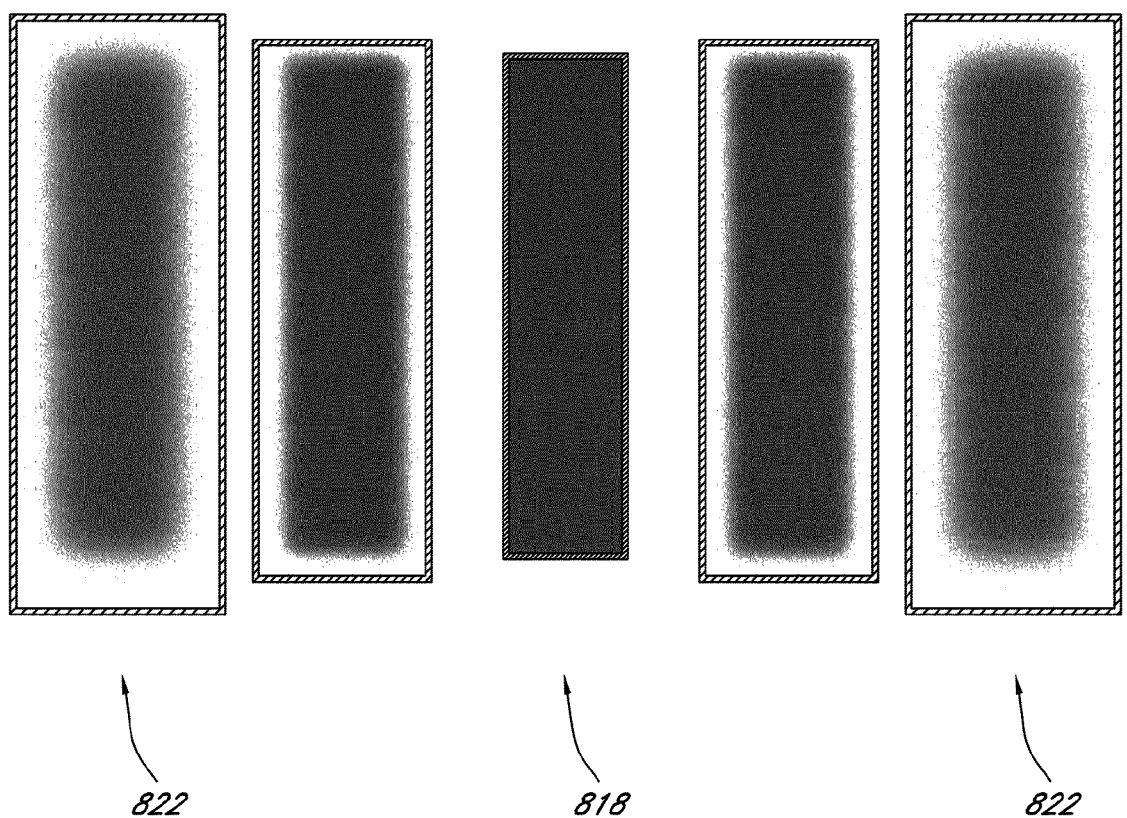
FIG. 5 shows highlights around objects, which highlights convey focus level data.

Other display embodiments highlight the objects themselves instead of using grids or graphs to display focus level data for a general area. In FIG. 5, the most focused object 306 has a bright highlight 818 that traces the object's edge. The least focused objects 310 have very dim highlights 822. The brightness of the highlight varies with the focus level of the object.

Alternatively, the display might draw a color tint around the edges of objects to indicate their respective focus levels. For instance, objects that are focused very well 306 would have a first color such as a red tint at their edge. Very poorly focused objects 310 have a second color such as a violet tint at their edge. Objects that are neither very well nor very poorly focused would carry a tint along their edge corresponding to their respective focus levels.

Rather than merely highlighting around each object, one embodiment raises the relief of an entire object when it is in focus. Objects that are out of focus 310 appear either flat or at a negative relief. Focused objects 306 rise up from the image, while unfocused objects 310 recede. The relief of each object corresponds to its focus level. This implementation has the advantage that the user can concentrate on the objects in the viewfinder to glean focus level data. Because this embodiment is highly intuitive, the user does not need to interpret much display data to determine the relative focus levels of objects in the display.

Figure 6:
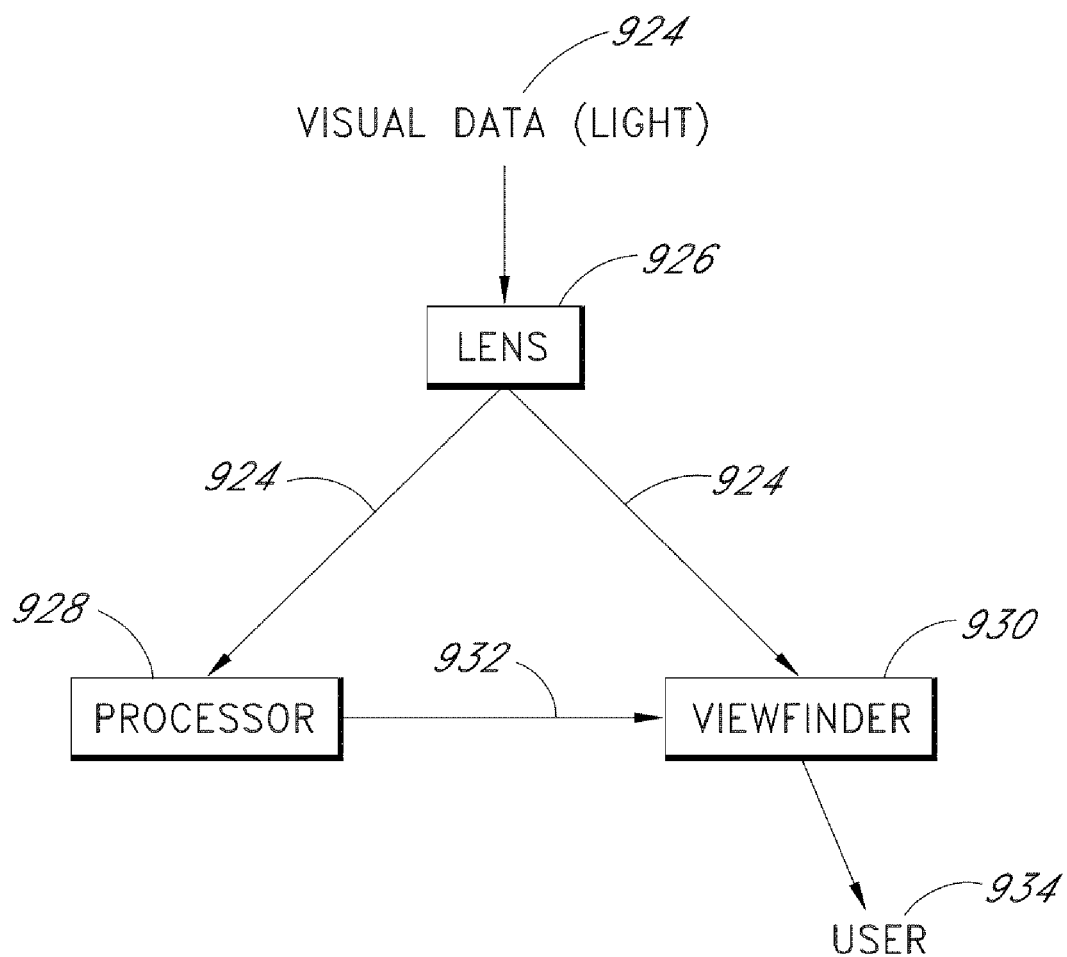
FIG. 6 shows a high-level diagram of the focus assist system.

FIG. 6 shows an embodiment of the architecture of a camera. The camera collects visual data 924 from the camera lens 926. The camera records the visual data 924 and displays a representation of the visual data 924 on the viewfinder 930. The camera also sends the visual data 924 to a processor 928. The processor uses an algorithm to compute focus level data 932 for the visual data 924. The processor sends that focus level data 932 to the viewfinder, where the user 934 sees it superimposed on the visual data 924. The viewfinder 930 shows focus level data 932 from the processor 928 and visual data 924 from the lens 926 contemporaneously.

In an alternative embodiment (not shown), in an autofocus camera, the processor that accepts the visual data and computes the focus level data is also the processor that computes focus level data for the autofocus system. An autofocus system automatically generates focus level data to determine the proper focus level setting. In this embodiment, that data is reused. Not only does the camera use the focus level data to achieve an optimal focus setting, but the data is also sent to the user through the viewfinder. The user can then confirm that the autofocus system has identified and set the focus level for the object or objects in which the user is interested.

The processor uses an algorithm to calculate the focus level data displayed to the user.

In one embodiment, the processor blurs image data to create a comparison image. For instance, the processor might use a Gaussian or quick box blur approximation, or convolve the image. The blurred image differs from the original image primarily at the edges of focused objects 306. With focused objects 306, the blurring process washes out the sharp contrast between the edge of the object 306 and its surroundings. The blurring process creates less change at the edges of unfocused objects 310. The soft contrast between an unfocused object 310 and its surroundings remains a soft contrast in the blurred, comparison image. Because edges are typically composed of the pixels that change the most during the blurring process, it is possible to find the edges of focused objects.

Several alternative algorithms exist to detect whether or not an image is in focus. Many of these are "edge detection" algorithms. Examples of edge detection algorithms can be found in *Fundamentals of Digital Image Processing* by Anil K. Jain, the entirety of which is incorporated here by reference.

One algorithm uses gradient operators to detect edges. Gradient operators are masks, or simple matrices, used to generate a gradient map. Gradient operators, when convolved with pixels in an image, yield a gradient map in two orthogonal directions. Similarly, compass operators yield a gradient map in a selected number of directions that correspond to compass directions. Once the gradient has been calculated, an edge is identified by searching for those spots where the gradient exceeds some threshold. The level of focus, generally, corresponds to the severity of the gradient.

Other edge detection algorithms apply a second-order derivative to the image. The derivative detects rates of change in pixel intensity across the image. Again, the algorithm usually convolves the image with an operator. Edges are identified by locations where the gradient exceeds some threshold, or more commonly, by searching for spots where the second derivative wave-form crosses zero. While zero crossings are useful to detect edges, they only return a binary value and therefore do not convey precise focus level data. Here again, the focus level generally corresponds to the severity of the gradient at objects' edges.

The gradient measures changes in the intensity of adjacent pixels. The intensity may be measured according to one or more of several different elements of each pixel. The intensity may refer to the red, green, or blue content of a pixel or any combination thereof. In YCbCr systems, it may refer to the luma or chroma component of each pixel or a combination thereof. In HSV systems, it may refer to the hue, the saturation, or the brightness components of the pixel, or any combination thereof. Depending on the color space of processing and display systems, the processor may use whichever components of the pixels' value that obtain the optimal gradient map or optimal focus level data.

One way of using an edge detection algorithm to derive focus level data for an entire image—rather than its edges only—is to use boundary extraction. By connecting edges, boundaries define the shape of an object. Assuming that an entire object is in focus if its edges are in focus, the camera can use boundary detection to determine the object's shape and impute the focus level at the object's edge to the rest of the shape.

A contour following algorithm is a boundary extraction algorithm that uses a series of horizontal or vertical steps chosen by trial and error. The correct step is determined by whether the step arrives inside or outside a boundary.

Another boundary extraction algorithm uses the computer science principle of dynamic programming. With dynamic programming the solution to a large problem is a function of the solutions to its sub-problems. In the boundary extraction context, that means that optimal sub-paths will lead to the optimal boundary.

The focus level detection algorithm measures focus level for a selection of pixels. The number and location of the pixels for which the algorithm calculates focus level data are a function of the speed of computation, detail of focus level data, and type of focus data desired to be displayed to the user.

Figure 7:
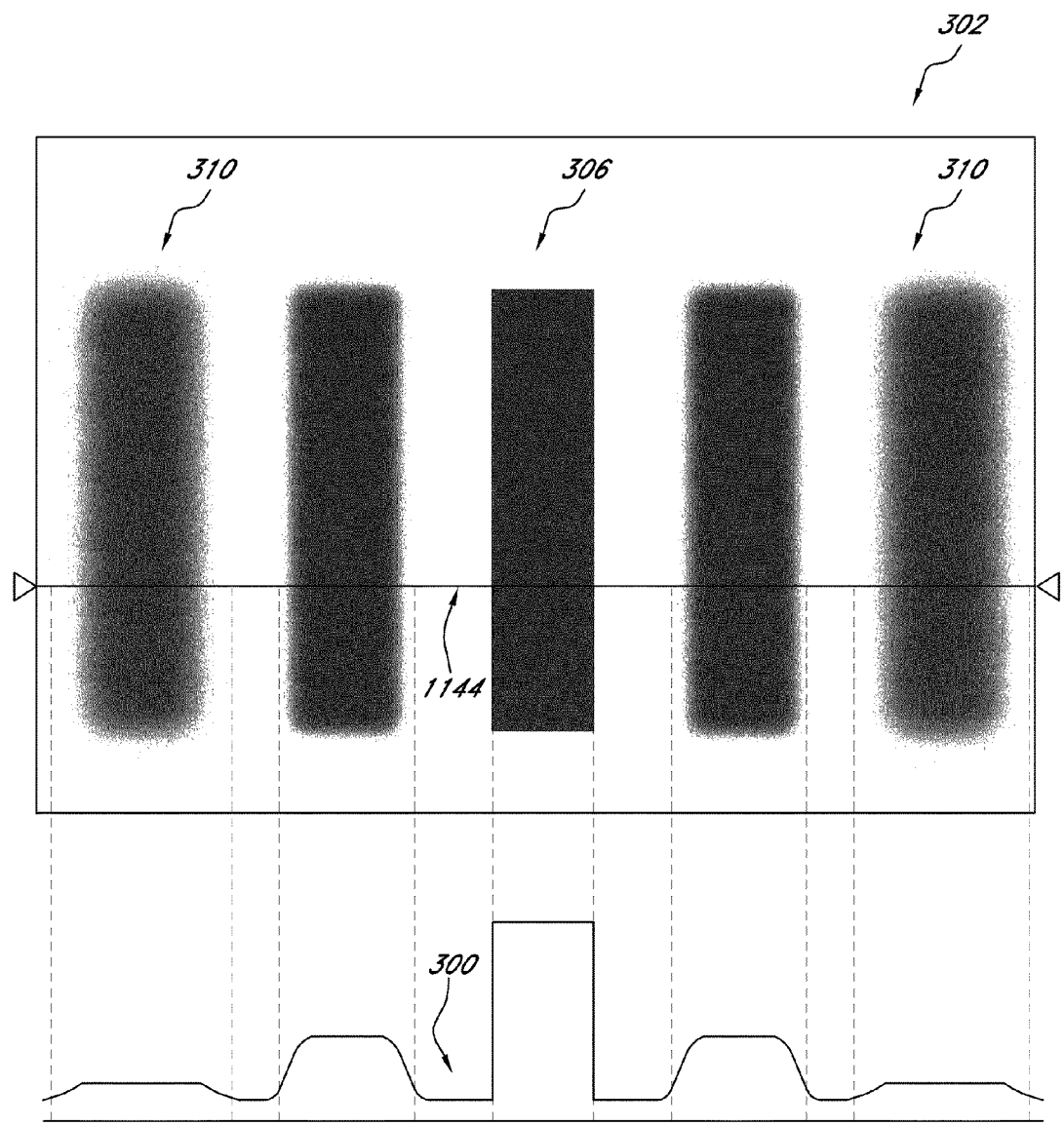
FIG. 7 shows a horizontal line graph conveying focus level data from a horizontal scan line.

In one embodiment, the focus level algorithm calculates focus level data for one or more "scan lines." The simplest example of the scan line embodiment is depicted in FIG. 7. In that figure, a single scan line 1144 extends horizontally across the image 302. The scan line 1144 need not be vertically centered. The user can adjust the position of the scan line 1144. The focus level algorithm calculates a focus level value for each pixel along the scan line 1144 and displays it as a point along line graph 300. In another embodiment, to save processing time, the focus level algorithm might measure no more than about 50% or no more than about 25% of the pixels, such as by measuring only every other pixel or only one of every several pixels on the scan line 1144. Line graph 300 shows how the focus level display corresponds to the focus level measured at each pixel along the scan line 1144.

Figure 8:
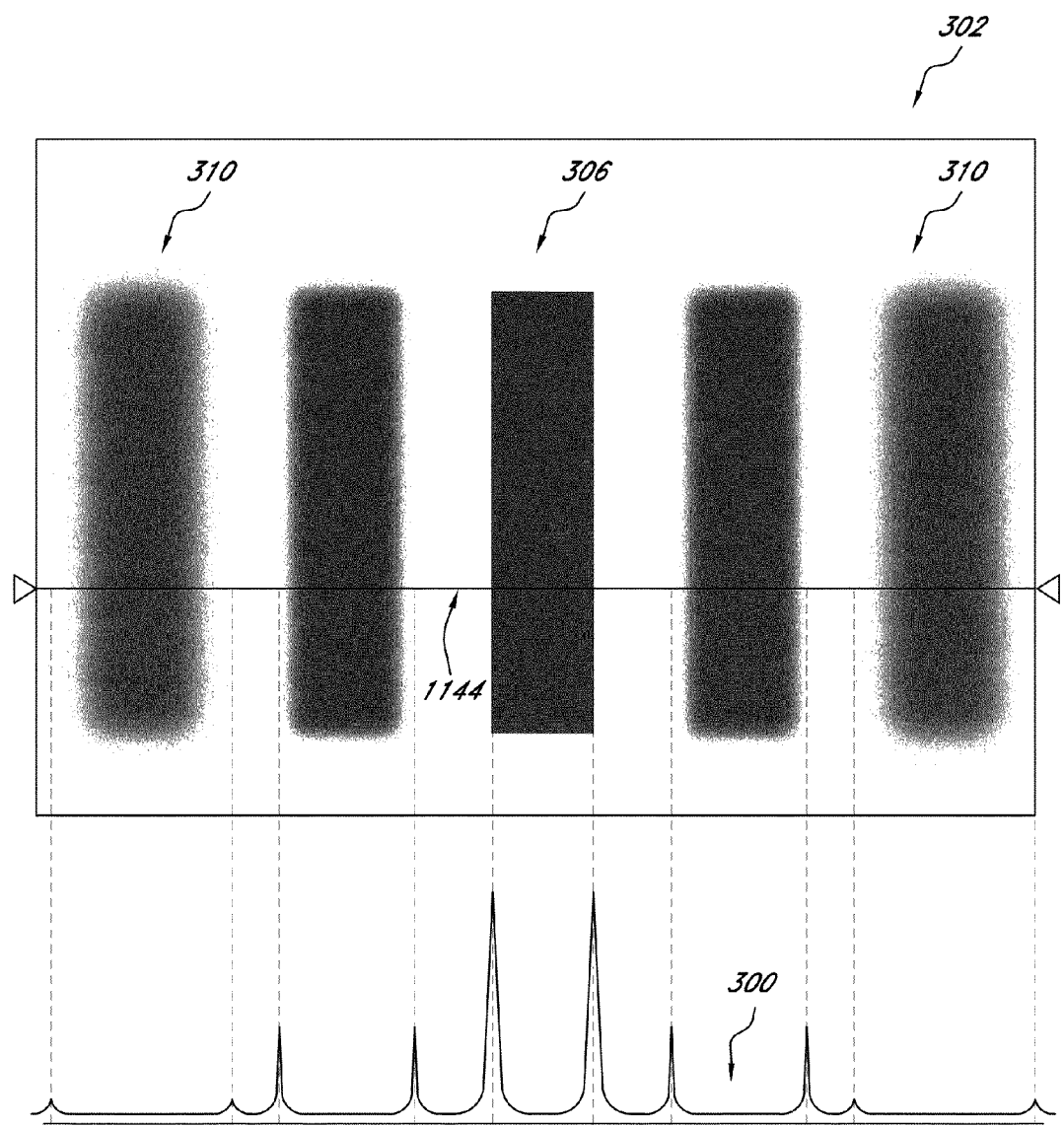
FIG. 8 shows a horizontal line graph conveying focus level data from a scan line, wherein the focus level data has been calculated using an edge detection algorithm.
Figure 11:
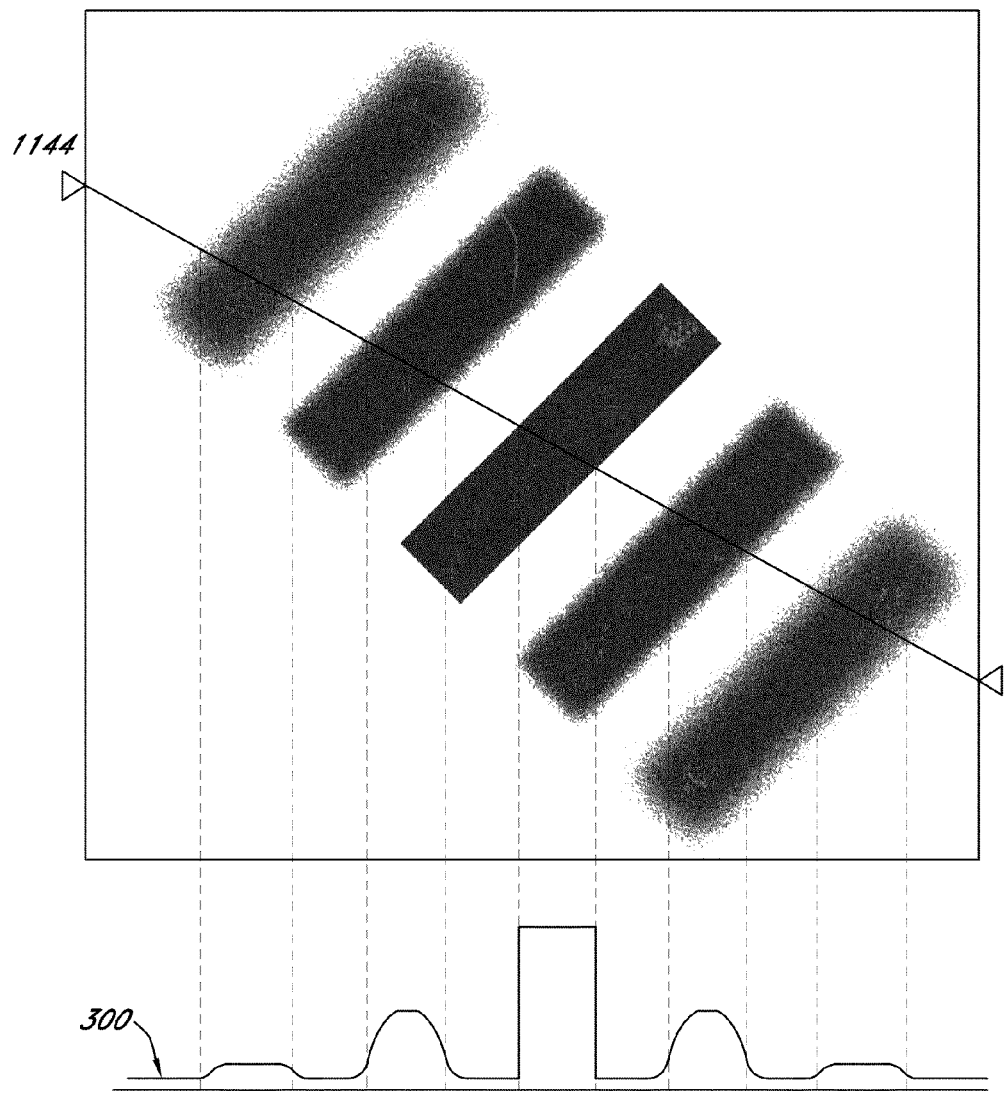
FIG. 11 shows a horizontal line graph conveying focus level data from a sloped scan line.

In FIG. 8, the scan line 1144 and display technique are identical to those of FIG. 11. But, instead of a smooth waveform, the line graph 300 has spikes. This spiked waveform depicts the data produced by an edge detection algorithm. The focus level data is more accurate at the edges of objects. At the edges of bars that are focused 306, the graph 300 shows a high value. Likewise, at the edges of bars that are not focused 310, the graph 300 shows low values. But, the graph 300 does not show high or low values for the middle parts of objects. In the middle parts of objects, the correspondence between high contrast—on which edge detection algorithms rely—and high focus, is less reliable. This is because the middle parts of objects are less likely to have high contrast values whether they are in focus or not.

Figure 9:
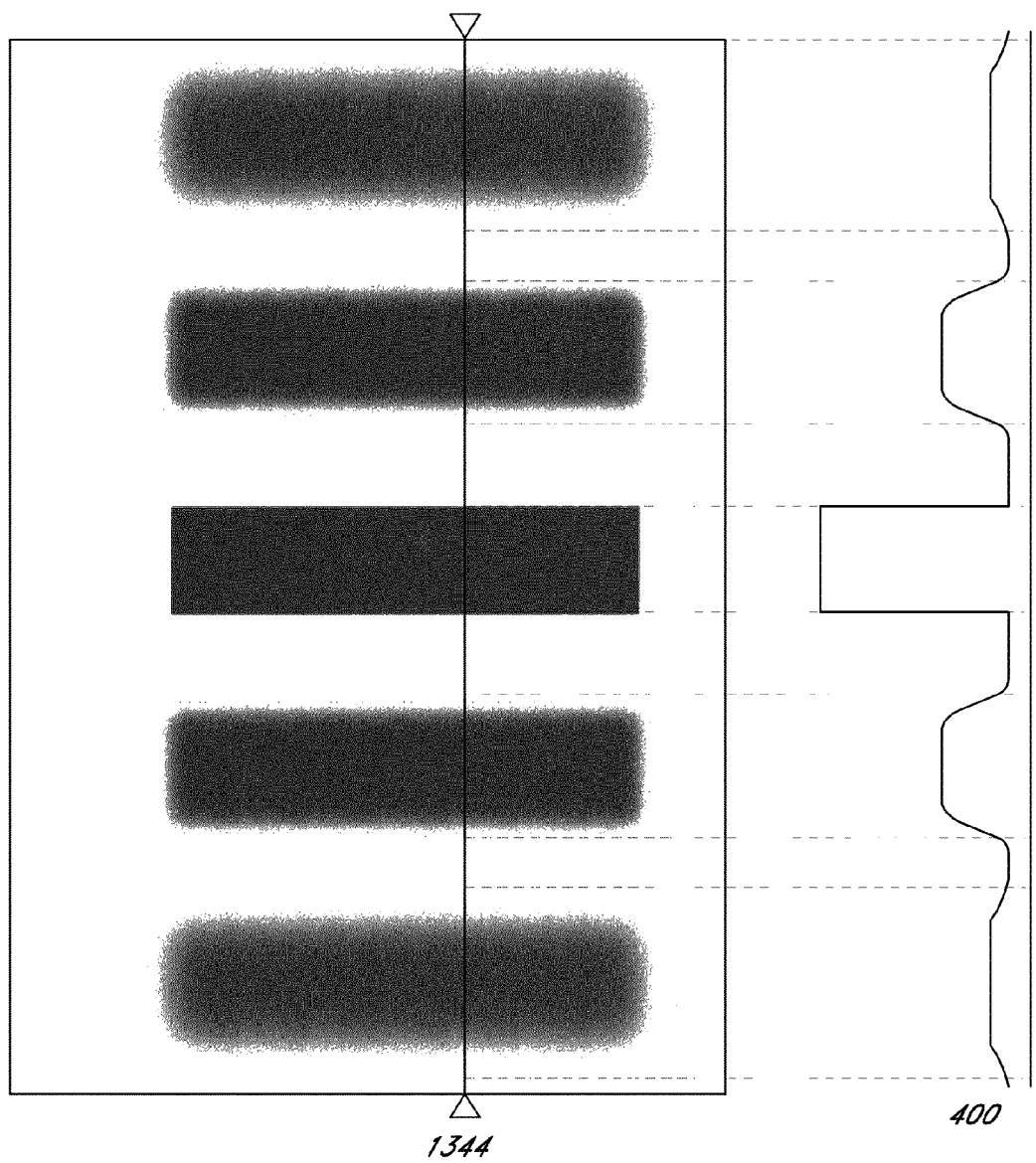
FIG. 9 shows a vertical line graph conveying focus level data from a vertical scan line.
Figure 10:
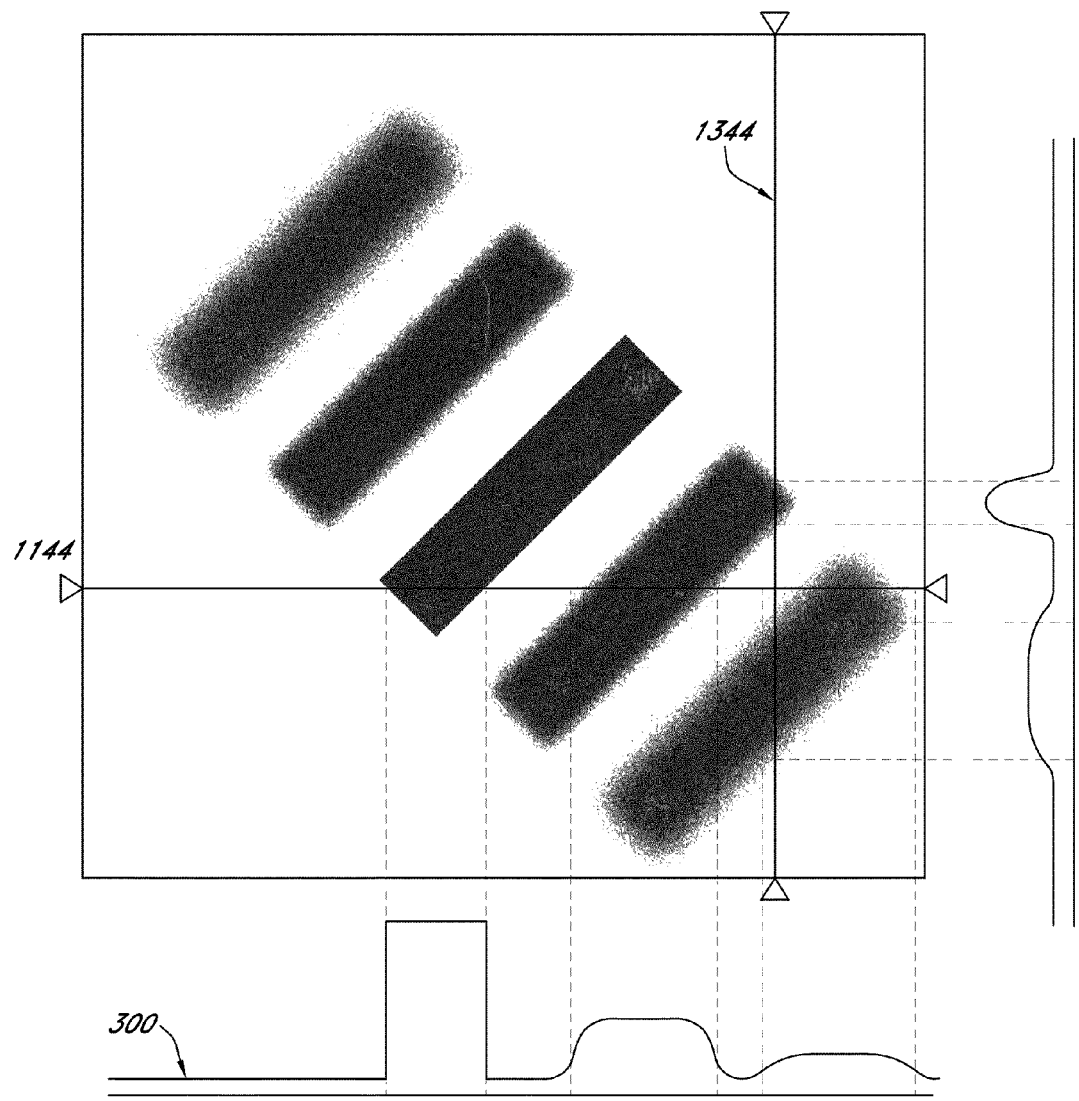
FIG. 10 shows horizontal and vertical line graphs conveying focus level data from horizontal and vertical scan lines, respectively.

The scan line 1344 might be vertically oriented, as in FIG. 9, rather than horizontally oriented. A vertical scan line 1344 gives better focus level data for a series of objects oriented vertically in the viewfinder. Like the horizontal chart for a horizontal scan line, a vertical chart 400 displays focus level data for a vertical scan line. Another, more detailed embodiment depicted in FIG. 10 employs both vertical 1344 and horizontal 1144 scan lines and both vertical 400 and horizontal 300 graphs.

The scan line need not run precisely horizontally (or vertically) across the image. The scan line 1144 might run at a slope, as in FIG. 11.

Figure 12:
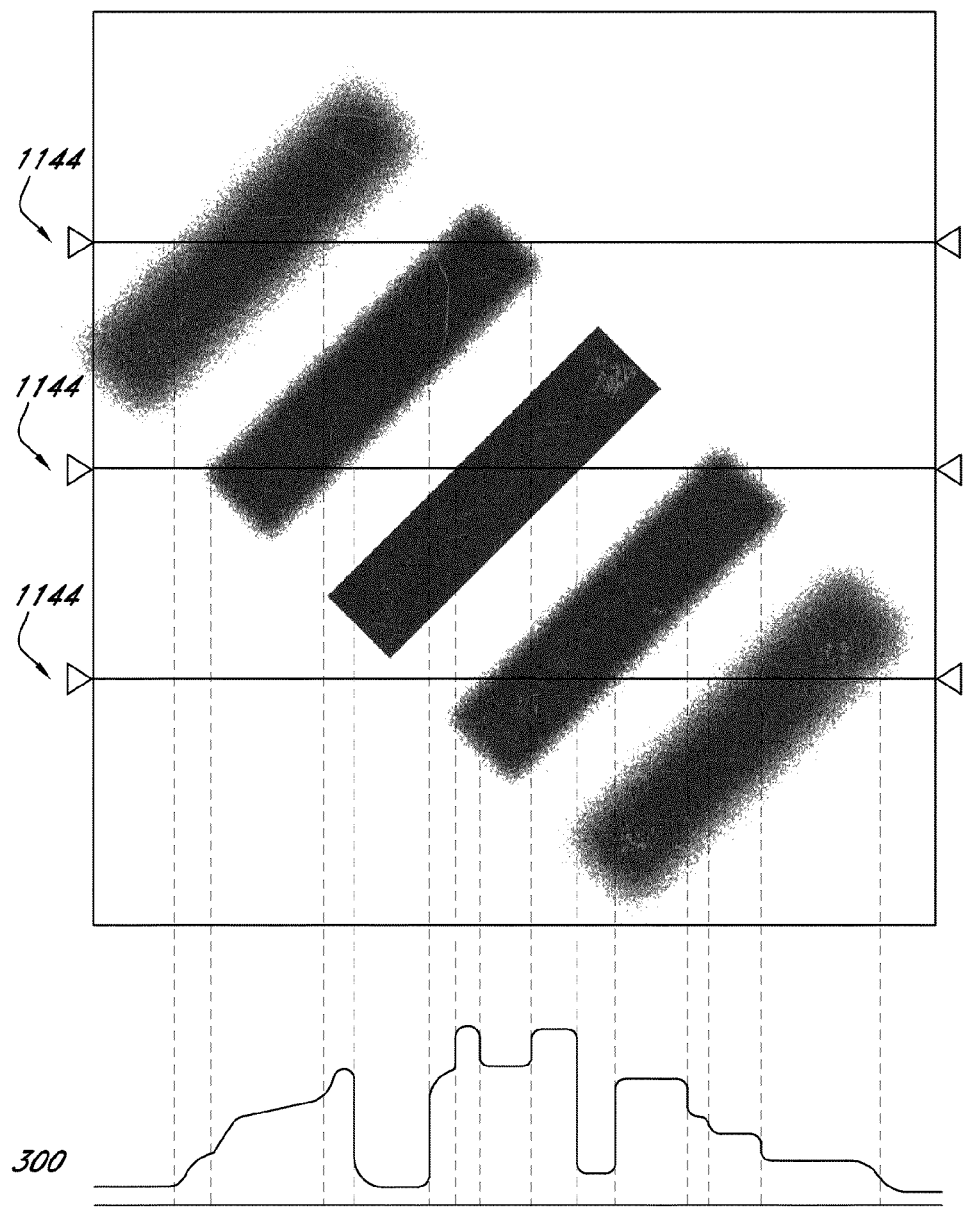
FIG. 12 shows a horizontal line graph conveying focus level data averaged from three scan lines.

In FIG. 12 the display again consists of a single-line graph 300. And, the algorithm again uses scan lines to identify the pixels for which it will calculate focus level data. But, instead of using only a single scan line, the algorithm averages data from multiple scan lines 1144, such as at least two, in some embodiments at least five, and in other embodiments at least 10 scan lines. Depending on the location of the scan lines and of objects in the image, this technique may improve the accuracy of the focus level display. The more scan lines 1144 the processor employs, the more focus level data it collects and the more accurate it will be. But, the more scan lines 1144 the processor employs, the more computations it must run and the slower it will generate focus level data. Again, the camera might use vertical scan lines 1344 instead of or along with horizontal scan lines 1144 for this or any scan-line technique.

Figure 13:
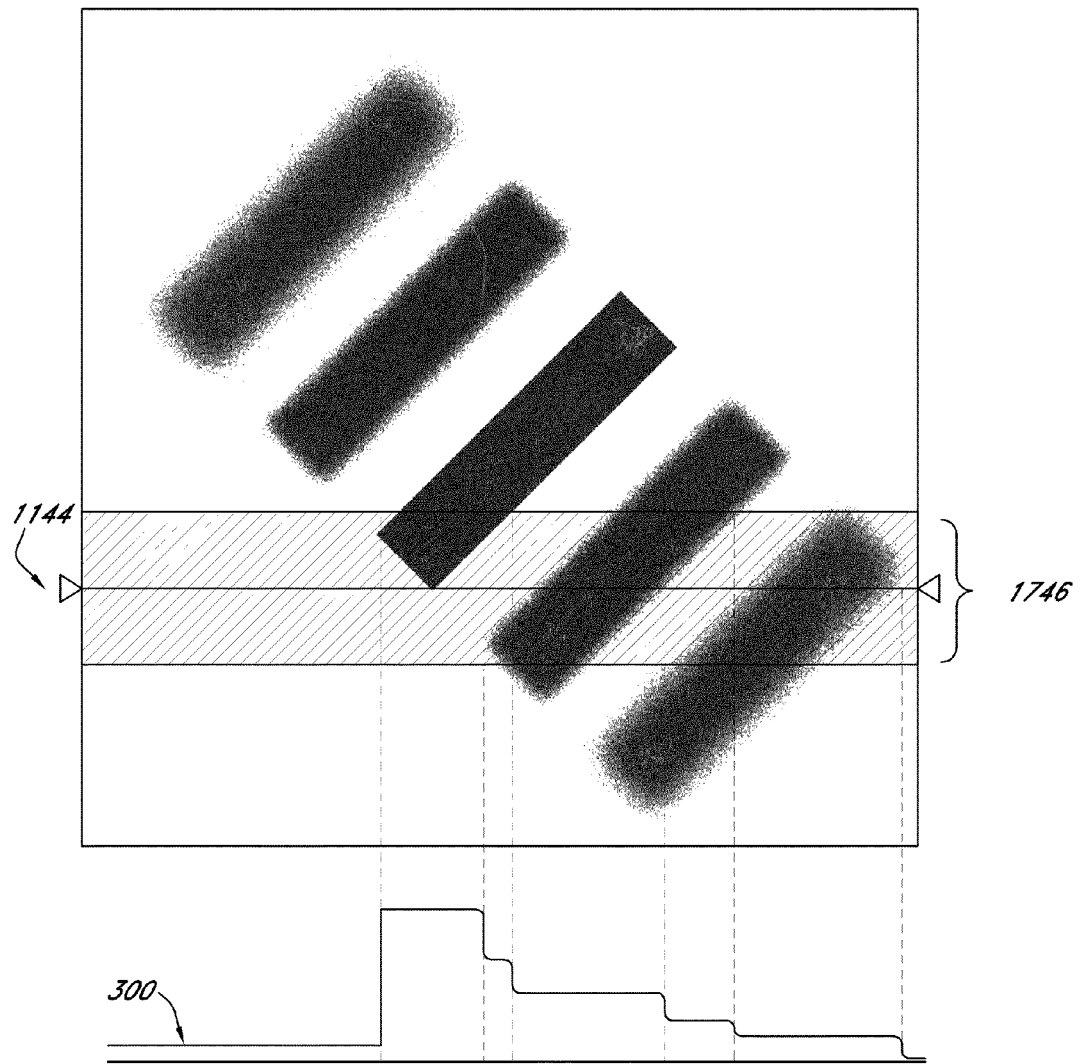
FIG. 13 shows a horizontal line graph conveying focus level data averaged from a scan line greater than one pixel wide.

FIG. 13 shows yet another embodiment based on the scan line. However, in this embodiment, the scan line 1144 is greater than a pixel in width. The scan-line width 1746 may be set to as many or as few pixels as desired. In fact, this is a variation on the multiple scan-line embodiment depicted in FIG. 12. A scan line 1144 a number of pixels in width 1746 is the same as that same number of adjacent scan lines, each one pixel in width. For example, the average focus level of a scan line 1144 five pixels wide 1746 is identical to the average focus level of 5 scan lines 1144, each adjacent to the next. To limit power consumption or decrease computational time, the processor might calculate focus level data only for every other adjacent scan line 1144 or one of every several adjacent scan lines 1144.

Figure 14:
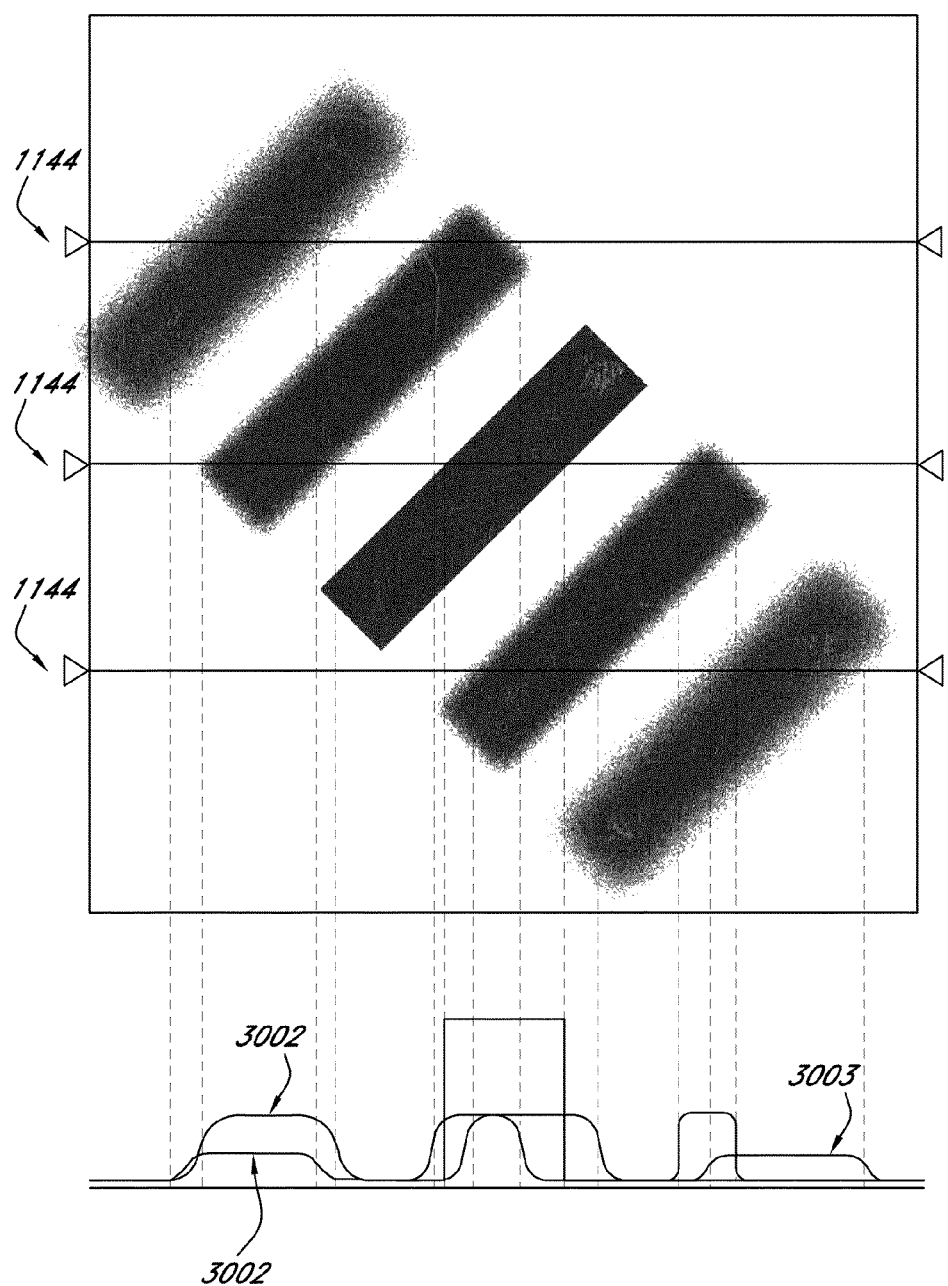
FIG. 14 shows a horizontal line graph conveying focus level data with three separate lines, each of which lines corresponds to a different horizontal scan line.

The processor need not generate an average focus level for multiple scan lines. FIG. 14 shows a graph display with a graph line 3001-03 corresponding to each scan line 1144. Alternatively, each graph line might convey average focus level data from multiple scan lines as an aid to the user.

In addition, the processor 928 might apply a secondary filtering algorithm to the focus level data from one or more scan lines. For instance, the processor 928 might apply an algorithm that zeroes all focus level values below a certain threshold. Such an algorithm might be used to eliminate noise from the display, to avoid distracting the user. The threshold may or may not be set at the same point as the baseline x-axis 312 in the display, depending on the desired height of the line graph 300 in the display. Indeed, the camera might allow the user to set the threshold. Like the x-axis 312 baseline, this algorithmic threshold might be set according to either an absolute value related to the slope of the gradient, as calculated by an edge detection algorithm. Or, it might be a function of the average level of focus of the image. For instance, the algorithm might eliminate focus level values for objects that have less than a threshold such as about 150% of the average focus level of the image. A secondary algorithm might also be used to smooth the focus level data, again to present a simplified, easily perceived waveform to the user. This technique might be useful with edge detection algorithms, which tend to produce spikes.

In short, the scan line embodiments are not limited by any particular scan lines or choice of pixels within those scan lines. Rather, the scan lines might be implemented in any permutation that satisfies a desired balance between computational speed, detail of information, and method of display to the user.

Scan lines are merely one method of applying a focus level detection algorithm. The algorithm might compute focus level information for the entire image, or for some alternative subset of that image. That alternative subset may be a geometric area. The geometric area might be defined by the user or it might be set by an algorithm, for example, to track a moving object in the viewfinder. The alternative subset might also be a pattern of pixels, designed as a representative sampling of the image, but at a lower level of detail and therefore requiring fewer computations.

In order to display focus level data in the pattern of a grid, the algorithm must calculate focus level data for at least a portion of each region within the grid. The algorithm might calculate focus level data for only a pixel within each region. The algorithm might calculate focus level data for the entire region and average the data to display an indication of the focus level.

If the algorithm calculates enough focus level data—at least enough for a representative sampling of the image—it is possible to display to the user focus level information based on edges superimposed on the image. Because an edge-detection algorithm returns data that corresponds to the edges of each object, the display might use that data to highlight the edges of objects in the viewfinder in real time. This might be done by varying the brightness of the edges of objects or by drawing a color around objects, the shade or width of which would correspond to the degree of focus.

Algorithms that generate reliable focus level data for entire objects enable other display techniques. One display varies the relief of an object according to its focus level. So, in focus objects would bulge out of the picture and become more prominent than unfocused objects. Similarly, another display renders objects in three dimensions when they are focused. The further out of focus the object becomes, the flatter it becomes in display.

It should be understood that the embodiments described herein may be implemented in a variety of ways. Other embodiments that are apparent to those of ordinary skill in the art, including embodiments which do not provide all of the benefits and features set forth herein, are also within the scope of this invention. For example, the camera could interface with a physically separate image processing device, such as a computer, or the image processing capabilities could be implemented within the camera. Further, algorithms may be implemented in a variety of ways, such as in hardware, software, or a combination of hardware and software. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims.

What is claimed is:

1. A method of providing feedback to allow focusing an image in real time, comprising:

using a programmed algorithm operating on one or more processors to determine a degree of focus of a plurality of regions of an image; and providing, on an electronic display, a visual indication of the degree of focus corresponding to each region.

2. The method of claim 1, wherein the visual indication comprises at least one waveform.

3. The method of claim 2, wherein the at least one waveform has variable intensity.

4. The method of claim 2, wherein the at least one waveform is superimposed on an image.

5. The method of claim 4, wherein the visual indication of the degree of focus for a particular region of the image is superimposed over the graphical representation of the particular region on the electronic display.

6. The method of claim 2, wherein one or more points on the waveform represent degrees of focus for corresponding portions of the image and are substantially aligned with graphical representations of the corresponding portions on the electronic display.

7. The method of claim 1, wherein the degree of focus of a region is indicated by varying the relief of that region.

8. The method of claim 1, wherein the degree of focus of a region is indicated by a geometric figure.

9. The method of claim 1, wherein each region is a line.

10. The method of claim 1, wherein the regions are described by a regular geometric pattern.

11. The method of claim 10, wherein the degree of focus of each region is indicated by varying the color of each region.

12. The method of claim 1, wherein the regions are described by edge detection.

13. The method of claim 12, wherein the degree of focus of each region is indicated by varying the brightness of each edge.

14. The method of claim 12, wherein the degree of focus of each region is indicated by varying the color of each edge.

15. The method of claim 1, wherein the visual indication of the degree of focus for a particular region of the image is visually correlated with a graphical representation of the particular region on the electronic display.

16. The method of claim 15, wherein the electronic display comprises one or more display screens of a camera and wherein both the visual indication of the degree of focus for each of the image regions and the graphical representation of each of the image regions are provided on the one or more display screens.

17. The method of claim 16, wherein the one or more display screens comprise a primary viewfinder screen and a secondary screen, the graphical representation of each of the image regions provided on the primary viewfinder screen, the visual indication of the degree of focus of each of the image regions provided on the secondary screen.

18. A method for assisting the adjusting of a focus of an image, comprising:
    detecting an image;
    applying an algorithm operating on one or more processors to determine a degree of focus of a plurality of regions of the image;
    providing a visual display indicative of the degree of focus corresponding to each of the plurality of regions; and
    updating the visual display in substantially real time.

19. The method of claim 18, wherein the algorithm comprises an edge detection algorithm.

20. The method of claim 18, wherein the algorithm comprises blurring image data from the detected image to create a comparison image.

21. The method of claim 18, wherein providing the visual display comprises displaying focus level data for regions that have a focus level above a focus threshold.

22. The method of claim 18, wherein the visual display comprises a waveform.

23. The method of claim 22, wherein one or more points of the waveform represent degrees of focus for corresponding portions of the image and are substantially aligned with graphical representations of the corresponding portions on the electronic display.

24. The method of claim 18, wherein the plurality of regions form a grid.

25. The method of claim 18, further comprising detecting an object present in the detected image, wherein the visual display comprises an indication of the degree of focus of the object.

26. The method of claim 25, wherein detecting the object present in the detected image comprises applying a boundary extraction algorithm.

27. The method of claim 18, further comprising providing a graphical representation of the image, and wherein the visual display indicative of the degree of focus for a particular image region is visually correlated with the graphical representation of the particular image region.

28. The method of claim 27, wherein the graphical representation of the image and the visual display indicative of the degree of focus of each of the plurality of regions are provided on an electronic display of a camera.

29. The method of claim 28, wherein the electronic display screen comprises a viewfinder screen.

30. A method of providing feedback to a user of a camera to allow focusing of an image in real time, comprising:
    detecting an image with an image sensor;
    applying an algorithm to determine a focus level of a plurality of regions of the detected image;
    displaying the detected image; and
    superimposing a visual indication of the focus level corresponding to each of the plurality of regions over the displayed image.

31. The method of claim 30, wherein the location of the plurality of regions is configurable.

32. The method of claim 30, wherein a configurable threshold level of focus is used to determine whether to superimpose a visual indication of the focus level for a region.

33. The method of claim 30, wherein the visual indication of the focus level of a particular image region is superimposed over the portion of the displayed image corresponding to the particular image region.

34. The method of claim 30, wherein the displayed image and the superimposed visual indication of the focus level of each of the plurality of regions are displayed on an electronic display of a camera.

35. The method of claim 34, wherein the electronic display comprises a viewfinder screen.

36. An apparatus for providing feedback to allow focusing of an image in real time, comprising:
    an image sensor configured to detect an image;
    an electronic display; and
    one or more processors configured to execute a programmed algorithm to determine a degree of focus of a plurality of regions of the image, wherein the electronic display displays the visual indication of the degree of focus corresponding to each region.

37. The apparatus of claim 36, wherein the visual indication comprises at least one waveform.

38. The apparatus of claim 37, wherein the at least one waveform is superimposed on an image.

39. The apparatus of claim 36, wherein the regions are described by a regular geometric pattern.

40. The apparatus of claim 39, wherein the degree of focus of each region is indicated by varying the color of each region.

41. The apparatus of claim 36, wherein the regions are described by edge detection.

42. The apparatus of claim 41, wherein the degree of focus of each region is indicated by varying the brightness of each edge.

43. The apparatus of claim 41, wherein the degree of focus of each region is indicated by varying the color of each edge.

44. The apparatus of claim 36, wherein the visual indication of the degree of focus for a particular region of the image is visually correlated with a graphical representation of the particular region on the electronic display.

* * * * *